United States Patent [19]
Lofberg

[11] Patent Number: 5,022,514
[45] Date of Patent: Jun. 11, 1991

[54] CONVEYOR FRAME ASSEMBLY

[75] Inventor: Lars C. Lofberg, Astorp, Sweden

[73] Assignee: Nestec S.A., Vevey, Switzerland

[21] Appl. No.: 536,000

[22] Filed: Jun. 8, 1990

Related U.S. Application Data

[63] Continuation of Ser. No. 259,876, Oct. 19, 1988, abandoned.

[30] Foreign Application Priority Data

Oct. 23, 1987 [EP] European Pat. Off. ............ 87115603

[51] Int. Cl.5 .............................................. B65G 23/44
[52] U.S. Cl. ..................................... 198/813; 198/816; 198/861.3
[58] Field of Search ............ 198/813, 815, 816, 860.1, 198/861.1, 861.2, 861.3

[56] References Cited

U.S. PATENT DOCUMENTS

| | | | |
|---|---|---|---|
| 1,418,577 | 6/1922 | Johnston | 198/813 |
| 2,888,130 | 5/1959 | Mousel | 198/861.3 X |
| 3,456,776 | 7/1969 | Viene | 198/813 |
| 3,870,140 | 3/1975 | Wieser | 198/861.1 X |
| 4,561,538 | 12/1985 | Zwiebel . | |

FOREIGN PATENT DOCUMENTS

| | | | |
|---|---|---|---|
| 2604424 | 4/1988 | France | 198/861.1 |
| 2041315A | 9/1980 | United Kingdom . | |
| 2126973A | 4/1984 | United Kingdom . | |

*Primary Examiner*—D. Glenn Dayoan
*Attorney, Agent, or Firm*—Vogt & O'Donnell

[57] ABSTRACT

A conveyor assembly for enabling removal of an endless belt trained around rollers fixed to axles has two rotatable plates connect to a conveyor frame having two parallel stationary plates. A first axle affixed with a roller is connected to the stationary plates, and a second axle affixed with a roller is connected to the rotatable plates which have slots for receiving the second axle. Belt tension adjusting means are provided which are integral to the rotatable plates and are connected to the second axle. The rotatable plates are connected to the stationary plates, the rotatable plates being connected to the stationary plates at an offset position with respect to a straight line extending between the first and second axles when the rotatable plates and stationary plates are in rectilinear relationship, so that the distance between the axles is at a maximum when a straight line extending between the axles also passes through a rotation center of the plates when the plates are rotated out of rectilinear relationship.

4 Claims, 1 Drawing Sheet

CONVEYOR FRAME ASSEMBLY

CROSS REFERENCE TO RELATED APPLICATIONS

This is a continuation application of application Ser. No. 07/259,876, filed Oct. 19, 1988, now abandoned.

BACKGROUND OF THE INVENTION

The present invention relates to a conveyor, more particularly to a conveyor with an endless belt which may be removed and replaced manually, for instance, for cleaning.

In certain food processes, e.g. in the preparation of chilled foods, it is essential that the equipment should be maintained in a clean and hygienic condition. For example, when conventional conveyors with endless belts are used, it is usually very time-consuming to clean the conveyors because the inside of the belt, the end rollers and all other conveyor parts covered by the belt are very difficult or impossible to clean in an acceptable way. In practice, this may destroy the quality of the chilled products, especially where the food material e.g. pizza garniture, comes into direct contact with the conveyor belt.

SUMMARY OF THE INVENTION

We have now devised a conveyor with an endless belt which can be removed and replaced for cleaning manually, without the need for any tools.

According to the present invention there is provided a conveyor with an endless belt which may be removed and replaced manually comprising a pair of rollers fixed on axles around which the belt is trained and a side frame member on each lateral side of the belt wherein each side frame member consists essentially of two plates linked in substantially end-to-end relationship at or near their adjacent edges, one of the plates being stationary and positioned parallel to the longitudinal direction of motion of the belt and the other plate being adapted to rotate about the linkage in the same plane as the stationary plate so that the two plates may lie in either substantially rectilinear relationship or in angled relationship, there being provided means for securing the plates in rectilinear relationship by the belt tension.

The belt that is trained around the rollers may be made of any conventional material for example, stainless steel, but a more elastic material is preferred such as polyvinyl chloride coated fabric.

The plates are generally flat and elongated. The plates that are adapted to rotate are preferably shorter than the stationary plates and advantageously they are positioned at the upstream end of the conveyor. Conveniently, the plates are made of stainless steel.

The means for securing the plates in rectilinear relationship by the belt tension may be provided by the rotation centre of the plate adapted to rotate being offset above or below a straight line connecting the centres of the axles of the rollers when the plates are in rectilinear relationship so that the distance between these axles has a maximum during rotation of the plates at a position between angled relationship and rectilinear relationship when the straight line connecting the centres of the axles also passes through the rotation centre of the plate adapted to rotate.

The plates may be, for instance, hinged or pivoted at the linkage and conveniently, the plates adapted to rotate are capable of being rotated by hand. When it is desired to remove the belt after normal operation of the conveyor with the plates in rectilinear relationship, the plates adapted to rotate are rotated, conveniently by pressing the end roller manually over the position where the rotation centre of the plates and the axles of the rollers are in a straight line before the belt is slackened sufficiently to permit easy removal by hand.

The replacement of the belt is carried out by fitting the belt on the conveyor while the plates are in angled relationship and rotating the plates adapted to rotate conveniently by pressing the end roller manually over the position where the rotation centre of the plates and the axles of the rollers are in a straight line until the plates are in rectilinear relationship, generally with means provided to prevent the plates adapted to rotate from passing beyond rectilinear relationship.

BRIEF DESCRIPTION OF THE DRAWINGS

The present invention will now be further described by way of example with reference to the accompanying drawings.

DETAILED DESCRIPTION OF THE DRAWINGS

Figure 1:
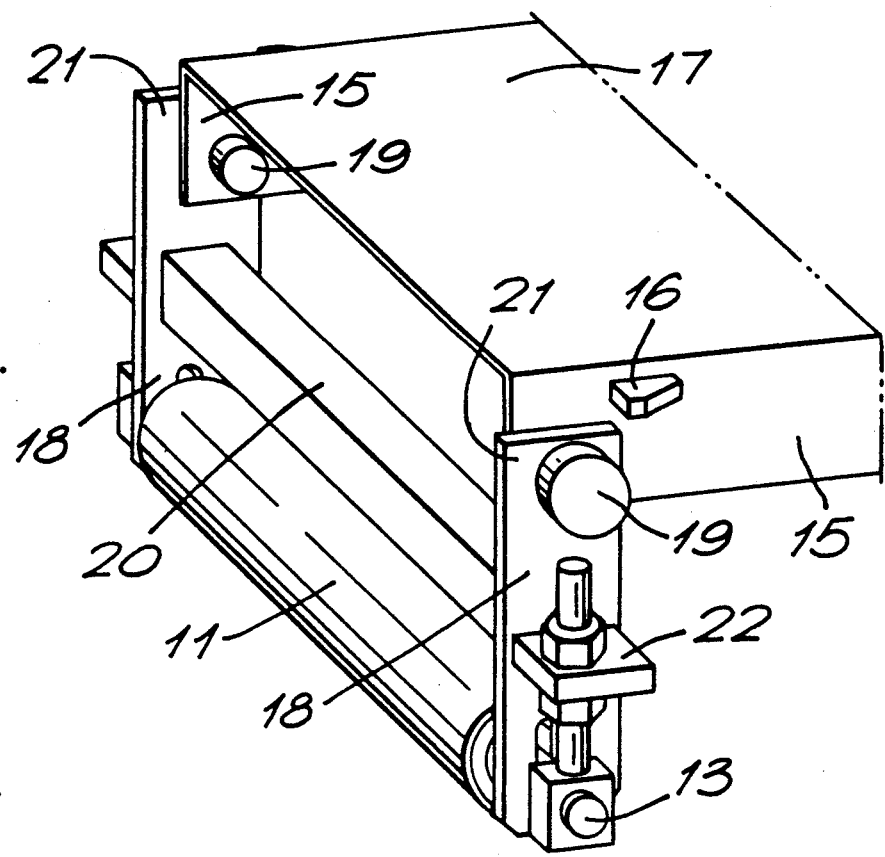
FIG. 1 is a perspective view of part of a conveyor with an endless belt showing the plates in angled relationship with the belt removed.

Referring to the drawings, a conveyor belt 10 made of PVC coated fabric is trained around rollers 11 and 12 which are fixed to axles 13 and 14, respectively. Fixed to axle 14 on each side are stationary plates 15 fitted with stop-lugs 16. The stationary plates 15 are connected to one another by a transverse support member 17. Fixed to the axle 13 on each side are plates 18 which are linked to plates 15 by means of pivots 19, and are adapted to rotate 90°. The plates 18 are connected to one another by a transverse bar 20. The corners 21 of plates 18 are adapted to press against the stop-lugs 16 when the plates are in rectilinear relationship. The structures 22 serve for adjusting the belt tension.

Figure 2:
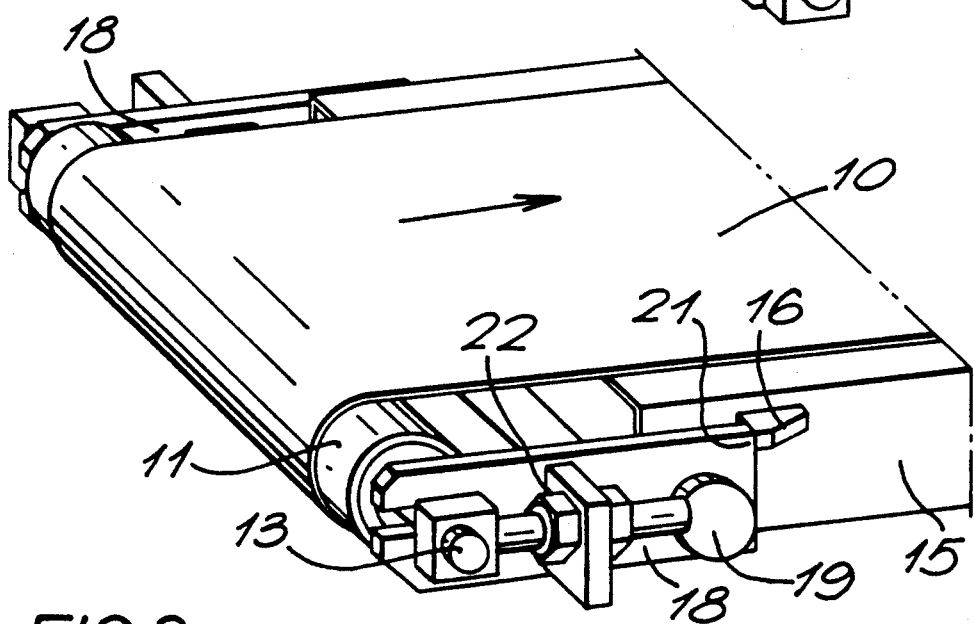
FIG. 2 is a perspective view of part of a conveyor with an endless belt showing the plates in rectilinear relationship.
Figure 3:
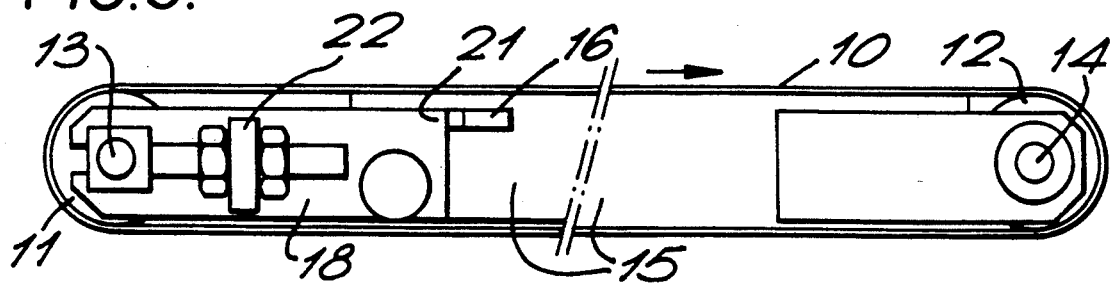
FIG. 3 is a side view showing both ends of a conveyor with an endless belt.

In operation, food material (not shown) is transported along the belt 10 in the direction of the arrow with the plates 15 and 18 in rectilinear relationship by means of the corners 21 of plates 18 pressing against the stop-lugs 16 so that the belt is taut as illustrated in FIGS. 2 and 3. When it is desired to remove the belt for cleaning the roller 11 is pressed manually over the position where the rotation centre of the plates 18 and the axles 13 and 14 are in a straight line to slacken the belt and then rotating the plates 18 on the pivot 19 to a position where the belt can be removed quickly and easily by sliding laterally off the rollers.

FIG. 1 shows the system with the belt removed and the plates 15 15 and 18 at 90° to one another. When the belt has been cleaned, it is replaced by passing around the rollers 11, 12 into position and rotating the roller 11 manually in the appropriate direction and then pressing it over the position where the rotation centre of the plates 18 and the axles 13 and 14 are in a straight line until the corners 21 of the plates 18 press against the stop-lugs 16.

I claim:

1. A conveyor assembly for enabling removal of an endless belt trained about rollers fixed to axles comprising:

a conveyor frame having two parallel stationary plates extending longitudinally from a first end to a second end;

a first axle connected transversely to the first end of each of the stationary plates;

a first roller fitted to the first axle;

a second axle;

a second roller fitted to the second axle;

two elongated rotatable plates, each of which is connected by a pivot linkage to the second end of a respective one of the stationary plates and each of which has a slot at an end away from the pivot linkage which receives the second axle, the rotatable plates being connected to the stationary plates at an offset position with respect to a straight line extending between the first and second axles when the rotatable plates and stationary plates are in rectilinear relationship, so that the distance between the axles is at a maximum when a straight line extending between the axles also passes through a rotation center of the plates when the plates are rotated out of rectilinear relationship;

an endless conveyor belt trained around the rollers of the first and second axles;

means integral to each rotatable plate for adjusting belt tension, each means being connected to the second axle; and means integral to each of the stationary plates and cooperating with belt tension for maintaining the rotatable plates in a rectilinear relationship with the stationary plates.

2. A conveyor assembly according to claim 1 wherein the means for maintaining the rotatable plates and the stationary plates in a rectilinear relationship are integral to and extend from the stationary plates and press against the rotatable plates when the rotatable plates and the stationary plates are in a rectilinear relationship.

3. A conveyor assembly according to claim 2 wherein the means for maintaining the rotatable plates and the stationary plates in a rectilinear relationship comprises a stop lug extending from sides of the stationary plates positioned to abut and press against the rotatable plates when the rotatable plates and stationary plates are in a rectilinear relationship.

4. A conveyor assembly according to claim 2 further comprising a transverse bar connecting the rotatable plates.

* * * * *